UNITED STATES PATENT OFFICE.

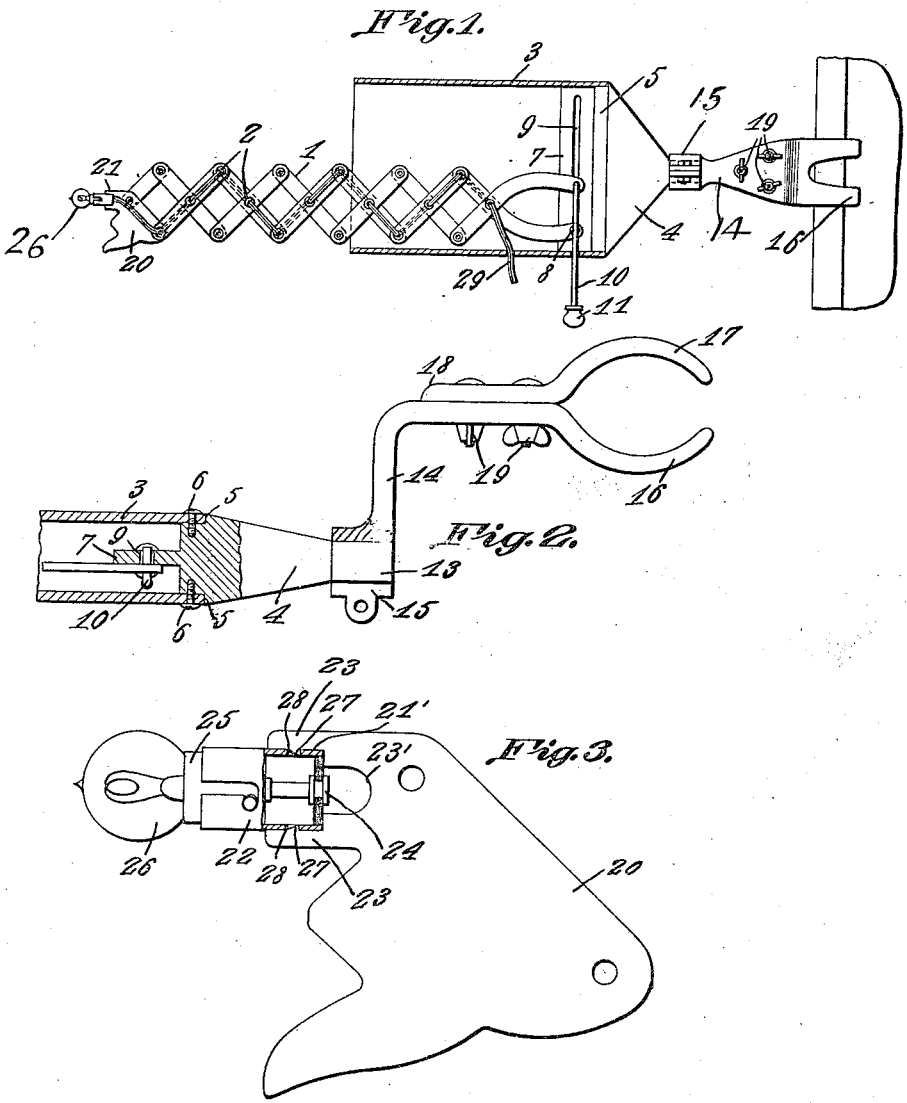

FELIX J. BENITOA, OF TAMPA, FLORIDA, ASSIGNOR TO NEW YORK SIGNAL COMPANY, INC., OF NEW YORK, N. Y.

VEHICLE-SIGNAL.

1,281,755.  Specification of Letters Patent.  Patented Oct. 15, 1918.

Application filed May 8, 1917.  Serial No. 167,358.

*To all whom it may concern:*

Be it known that I, FELIX J. BENITOA, a citizen of Spain, residing at Tampa, in the county of Hillsboro and State of Florida, have invented a new and useful Vehicle-Signal, of which the following is a specification.

The present invention appertains to vehicle signals, such as are used upon automobiles and other vehicles for signaling to other vehicles and pedestrians, the intentions of the operator to turn or stop, whereby to avoid confusion and collision.

It is the object of the invention to provide a vehicle signal embodying a lazy tong signal arm, and novel means for assembling the signal arm, its housing and supporting means.

Another object of the invention is the provision of improved adjustable supporting means for the signal attachable to the wind shield of an automobile or other support.

A still further object of the invention is the provision of novel means for assembling a lamp socket with the index of the signal arm, in order that the socket can be readily assembled with the index, and will be firmly held in place, for the reception of the electric lamp or bulb.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a side elevation of the signal, the signal arm housing being shown in section.

Fig. 2 is a plan view, on an enlarged scale, of the supporting means, portions being shown in section.

Fig. 3 is an enlarged elevation of the index and lamp socket, portions being shown in section.

The signal arm is of lazy-tong construction, embodying crossed levers pivotally connected by eyelets 2, whereby said arm can be extended and retracted. A housing 3, preferably constructed of sheet metal, is provided for receiving and shielding the signal arm 1 when retracted, both ends of said housing being open.

In order to support the housing and signal arm in an effective manner, there is provided a head 4 of suitable shape, and conforming in outline with the housing 3, said head being provided with a marginal rabbet 5 receiving the inner end or edge of the housing 3, and in which said end of the housing is secured by means of screws 6 or other securing elements extending through the walls of the housing and taking into the head 4. The head 4 thus serves as a support for the housing, and also provides a closure for the inner end thereof. Furthermore, the head 4 serves as a support for the signal arm 1. Thus, the head 4 is provided with a flange 7 projecting therefrom into the housing 3, and disposed vertically as illustrated. One of the innermost levers of the arm 1 is pivoted, as at 8, to the flange 7, preferably near the lower end thereof, and said flange is provided with a longitudinal elongated slot 9 receiving the angular end of a rod 10 engaging the other inner lever of the signal arm. The rod 10 extends downwardly through the bottom of the housing 3, and carries an exterior knob 11, which when raised and lowered will retract and project the signal arm. When the signal arm is retracted, in the housing 3, by pulling the knob 11 downwardly, this will project the arm 1 from the housing so that it will be visible to the traffic. The head 4 tapers to an outstanding shank 13 for supporting said head from a bracket.

This bracket, designated 14, is in the form of an elbow, having a clamp 15 at one end, and arranged at right angles with the corresponding arm of the elbow, for receiving the shank or stud 13, whereby the head 4 and housing 3 can be readily attached and adjusted about an axis at right angles with said arm of the elbow. The other end of the elbow or bracket 14 has a jaw 16 complementing a loose jaw 17 having a shank 18 fastened by bolts 19 or other securing elements with that arm of the elbow 14 having the jaw 16, whereby said jaws can be clamped to a wind shield or other support. The clamp provided by the jaws 16—17 is adapted to embrace a post or other support at right angles to the plane of the elbow or bracket 14, while the clamp 15 holds the shank 13 in the plane of the elbow. By the provision of this bracket, the head 4 can be supported in the desired position from the wind shield or other part of the vehicle.

The links or levers at the free end of the arm 1 is in the form of an index 20, stamped from sheet metal, and having an outwardly projecting finger 21 provided with a recess 21' for receiving a lamp socket 22. The recess 21' provides opposite resilient prongs 23 between which the lamp socket 22 is fitted, and the index 20 has a secondary recess 23' at the inner end of the recess 21' for receiving and accommodating the central insulated contact 24 of the lamp socket 22.

The plug 25 of the electric lamp or bulb 26 is engaged within the socket 22 in any suitable manner. The adjacent edges of the prongs 23 have teeth 27 projecting therefrom to enter apertures 28 provided in opposite sides of the lamp socket 22, said teeth being beveled, whereby when the lamp socket is forced into the recess 21', the socket in engaging the teeth 27 will spring the prongs 23 apart, so that when the socket is moved home the teeth 27 will enter the apertures 28, the prongs 23 springing back into place against the lamp socket. The conductors 29, or cords, are threaded through the eyelets 2 and connected to the lamp socket 22 in any suitable manner, for supplying electrical energy to the lamp 26 during the night time. These cords 29 extend into the housing 3 and through an aperture thereof for connection with the electrical equipment of the vehicle.

Having thus described the invention, what is claimed as new is:—

A device of the character described, having a retractable and projectable arm, an index carried by the free end of said arm having a finger, said finger having a recess providing resilient prongs, and a member to fit in said recess having opposite apertures, said prongs having beveled teeth to snap into said apertures.

In testimony that I claim the foregoing as my own, I have hereto affixed my signature in the presence of two witnesses.

FELIX J. BENITOA.

Witnesses:
  IVY E. SIMPSON,
  PHILOMENA A. ROCKELLI.

Copies of this patent may be obtained for five cents each, by addressing the "Commissioner of Patents, Washington, D. C."